United States Patent
North et al.

(10) Patent No.: US 9,599,995 B2
(45) Date of Patent: Mar. 21, 2017

(54) TETHERED VEHICLE CONTROL AND TRACKING SYSTEM

(71) Applicant: The United States of America as represented by the Administrator of the National Aeronautics and Space Administration, Washington, DC (US)

(72) Inventors: David D. North, Williamsburg, VA (US); Mark J. Aull, Cincinnati, OH (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 144 days.

(21) Appl. No.: 14/560,339

(22) Filed: Dec. 4, 2014

(65) Prior Publication Data

US 2015/0153741 A1    Jun. 4, 2015

Related U.S. Application Data

(63) Continuation of application No. 13/765,714, filed on Feb. 13, 2013, now Pat. No. 8,922,041.

(Continued)

(51) Int. Cl.
*G05D 1/10* (2006.01)
*F03D 7/00* (2006.01)

(Continued)

(52) U.S. Cl.
CPC ............ *G05D 1/105* (2013.01); *B64C 31/06* (2013.01); *F03D 5/06* (2013.01); *F03D 7/00* (2013.01);

(Continued)

(58) Field of Classification Search
CPC ...... G05D 1/105; G05D 1/0866; B64C 31/06; F03D 5/06; F03D 7/00; F03D 9/002;

(Continued)

(56) References Cited

U.S. PATENT DOCUMENTS 6,327,994 B1 * 12/2001 Labrador ............... B01D 61/10
  114/382
7,188,808 B1 * 3/2007 Olson ....................... F03D 5/00
  244/153 R (Continued)

OTHER PUBLICATIONS http://www.mathworks.com/help/fuzzy/foundations-of-fuzzy-logic.html [retrieved Jun. 21, 2016], pdf format printed copy.*

*Primary Examiner* — Michael Zarroli
(74) *Attorney, Agent, or Firm* — Andrea Z. Warmbier

(57) ABSTRACT

A kite system includes a kite and a ground station. The ground station includes a sensor that can be utilized to determine an angular position and velocity of the kite relative to the ground station. A controller utilizes a fuzzy logic control system to autonomously fly the kite. The system may include a ground station having powered winding units that generate power as the lines to the kite are unreeled. The control system may be configured to fly the kite in a crosswind trajectory to increase line tension for power generation. The sensors for determining the position of the kite are preferably ground-based.

12 Claims, 16 Drawing Sheets

Related U.S. Application Data

(60) Provisional application No. 61/709,187, filed on Oct. 3, 2012.

(51) Int. Cl.
*B64C 31/06* (2006.01)
*F03D 9/00* (2016.01)
*F03D 5/06* (2006.01)
*G05D 1/08* (2006.01)

(52) U.S. Cl.
CPC ........... *F03D 9/002* (2013.01); *G05D 1/0866* (2013.01); *F05B 2270/707* (2013.01); *Y02E 10/70* (2013.01); *Y02E 10/723* (2013.01); *Y02E 10/725* (2013.01)

(58) Field of Classification Search
CPC .. F05B 2270/707; Y02E 10/70; Y02E 10/723; Y02E 10/725
See application file for complete search history.

(56) References Cited

U.S. PATENT DOCUMENTS

| | | | | |
|---|---|---|---|---|
| 7,275,719 | B2* | 10/2007 | Olson | F03D 5/04 244/153 R |
| 7,656,053 | B2* | 2/2010 | Griffith | B63H 9/0685 244/153 R |
| 8,405,244 | B2* | 3/2013 | Zhang | F03B 17/06 290/55 |
| 9,080,550 | B2* | 7/2015 | Goldstein | F03D 9/002 |
| 2008/0258006 | A1* | 10/2008 | Chan | E04H 12/20 244/1 R |
| 2015/0212391 | A1* | 7/2015 | Waibel | G03B 15/006 701/2 |

\* cited by examiner

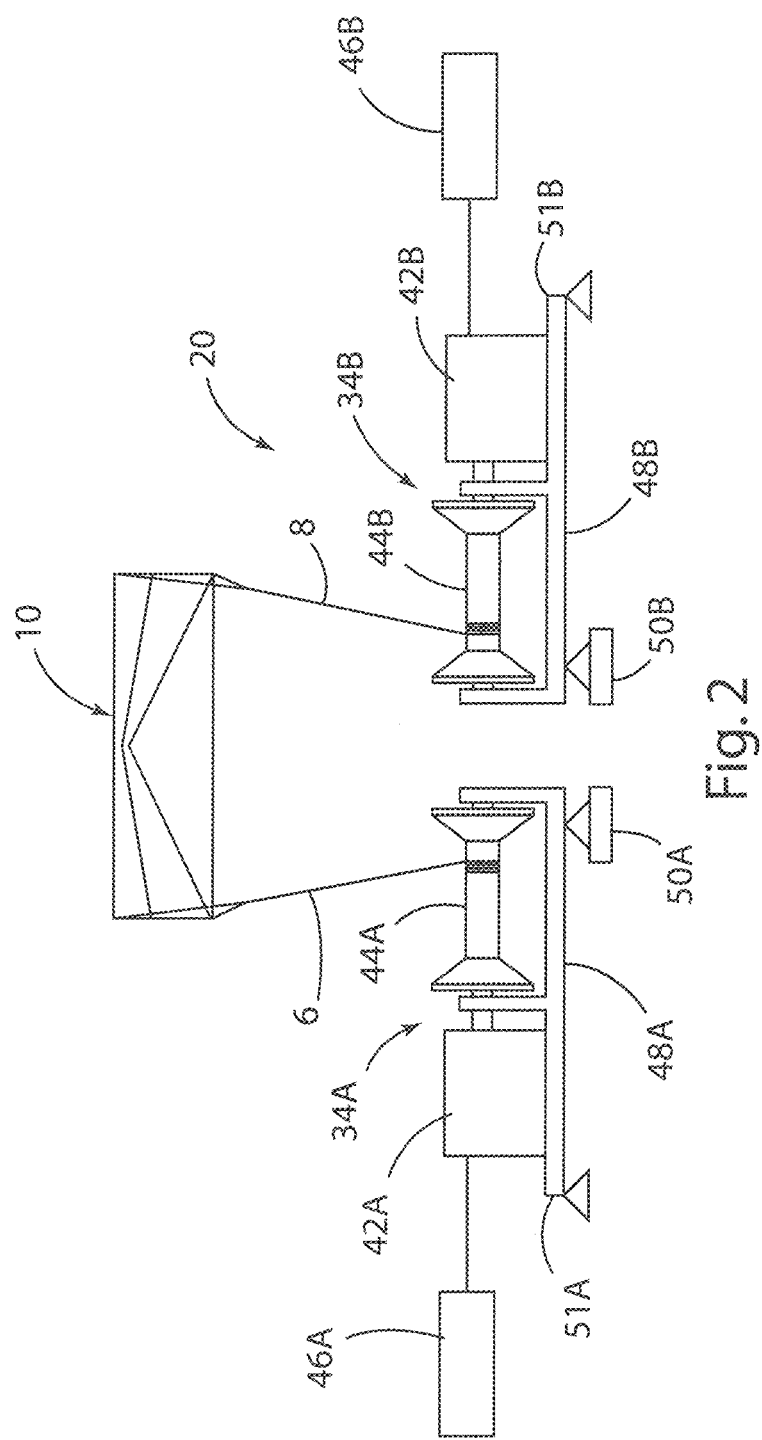

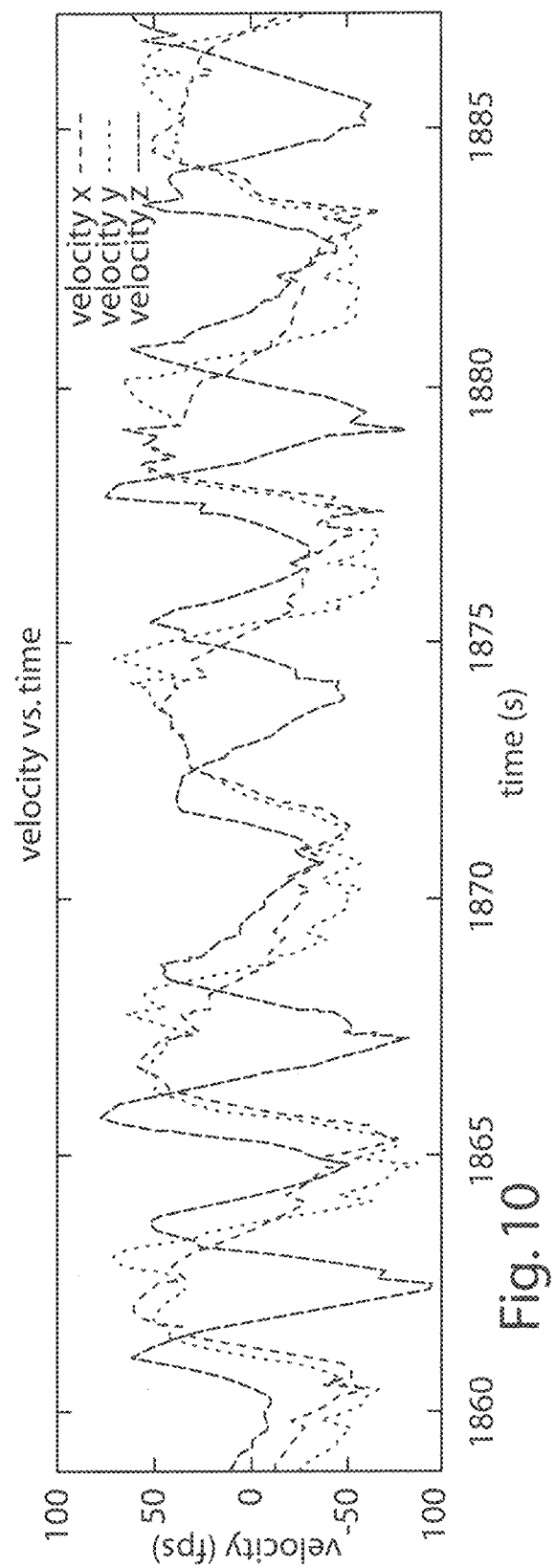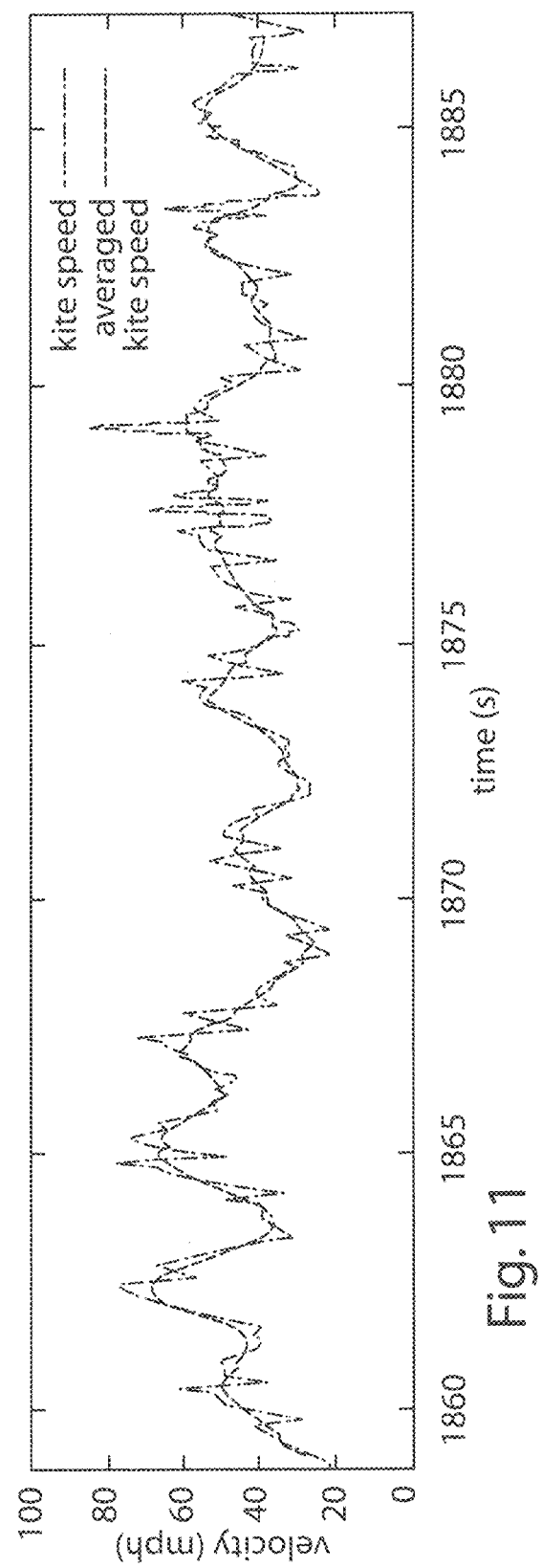

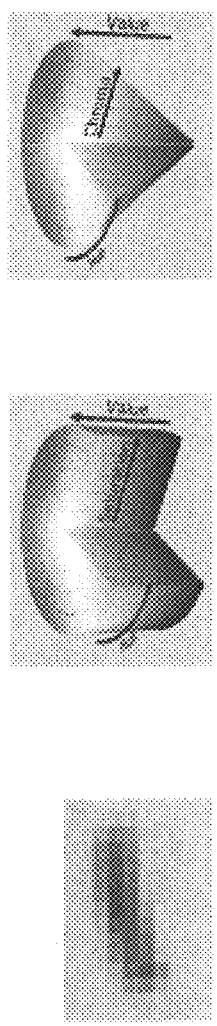

TETHERED VEHICLE CONTROL AND TRACKING SYSTEM

CROSS-REFERENCE TO RELATED PATENT APPLICATION

This patent application is a continuation of and claims the benefit of priority to U.S. patent application Ser. No. 13/765,714, filed on Feb. 13, 2013, which claims the benefit of and priority to U.S. Provisional Patent Application No. 61/709,187, filed on Oct. 3, 2012, the contents of which are hereby incorporated by reference in their entirety.

STATEMENT REGARDING FEDERALLY SPONSORED RESEARCH OR DEVELOPMENT

The invention described herein was made in part by an employee of the United States Government and may be manufactured and used by or for the Government of the United States of America for governmental purposes without the payment of any royalties thereon or therefore.

BACKGROUND OF THE INVENTION

Airborne wind energy (AWE) generally refers to producing energy from wind using a tethered air vehicle (i.e. a kite). A system of this type has a significant advantage over ground based wind turbines because it can take advantage of higher altitude winds which are faster and more reliable than surface level winds. Two known methods of implementing an AWE system are referred to as flygen and groundgen systems. Flygen involves putting a turbine and generator on a kite and transmitting power over wires to the ground. In contrast, groundgen systems use a kite to produce mechanical energy which turns a generator on the ground.

Flygen systems require a turbine and generator on board the kite, and a large kite capable of generating high lift is therefore required. Since the kite (which may resemble a glider aircraft) and its payload are relatively expensive, it is necessary to develop a sufficiently reliable control system to prevent crash landings. Control systems may utilize sensors such as GPS receivers and inertial measurement systems connected to an on-board autopilot. These components further increase the cost of the system.

On type of groundgen system utilizes the tension in the lines to turn a generator. If the kite is reeled out while flying (e.g. in a crosswind trajectory), the kite produces power equal to the product of line tension and line velocity. After the line is fully reeled out, the kite can be flown directly over its pilot on the ground, decreasing the line tension and allowing the kite to be reeled in at a very low line tension. Thus, the kite can be reeled in utilizing less energy than the kite generated as the line reeled out by controlling the trajectory of the kite as it is reeled in and out.

Airborne wind energy systems generally require high speed crosswind flight to generate high line tensions and thereby maximize power output. When a kite is flown perpendicular to the wind direction (e.g. in a circle or Figure 8 pattern), its crosswind component of velocity is a factor of L/D higher than the airspeed in the wind direction (equation 1, below). For groundgen systems, this expression, along with an assumed line speed, can be used to find the airspeed of the kite, the lift, line tension, and finally power (equations 1-6). Assuming a high L/D ratio, neglecting parasitic drag, and using a small angle approximations results in $v_a = v_c$, $T = L$ and approximate power production can be calculated (equation 7). A line speed of $v_l = v_w/3$ maximizes power (equation 8).

$$v_c = (v_l - v_w)(L/D_k) \quad (1)$$

$$v_a = (v_l - v_w)\sqrt{1 + (L/D_k)^2} \quad (2)$$

$$L = \frac{1}{2}\rho C_L A v_a^2 \quad (3)$$

$$T_l = \sqrt{L^2 + D_k^2} = L\sqrt{1 + \frac{1}{(L/D_k)^2}} \quad (4)$$

$$P_w = \frac{1}{2}\rho v_w^3 \quad (5)$$

$$P = v_l T_l \quad (6)$$

$$P = \frac{1}{2}\rho A C_L (L/D_k)^2 v_l (v_l - v_w)^2 \quad (7)$$

$$P = \frac{2}{27}\rho A C_L (L/D_k)^2 v_w^3 \quad (8)$$

Where:
A=kite planform area
$C_L$=coefficient of lift
$D_k$=induced drag
L=lift
P=power
$P_w$=wind power density
$\rho$=air density
$T_l$=line tension
$v_a$=airspeed
$v_c$=crosswind component of velocity
$v_l$=line speed
$v_w$=wind speed However, known kite control systems suffer from various drawbacks.

BRIEF SUMMARY OF THE INVENTION

One aspect of the present invention is a kite system for generating power. The kite system includes a kite and first and second lines connected to the kite. The system further includes first and second powered winding members, wherein the first and second powered winding members reel in the first and second lines if the first and second powered winding members are actuated, and the first and second powered winding members generate power if the first and second lines, respectively, reel out due to tension being applied to the first and second lines by the kite thereby rotating the first and second powered winding members due to forces on the first and second lines. The first and second lines control the kite such that the kite tends to turn left if the first line is shortened relative to the second line, and the kite tends to turn left if the second line is shortened relative to the first line. The system further includes a device configured to determine an angular position of the kite relative to a ground surface. The device may comprise a camera and an image processing system. The kite system further includes a controller that is operably connected to the first and second powered winding members and to the camera or other device that determines an angular position of the kite. The controller utilizes measured input values including an angular position of the kite and a velocity of the kite. The controller utilizes a fuzzy logic based control scheme that includes categorizing the measured input values into classes, wherein the degree of membership of the measured input values in each of several possible classes is determined utilizing a membership function that maps the measured input variables to a truth value in a predefined range. The range is bounded by minimum and maximum values signifying degrees of membership ranging from no membership to full membership. The minimum and maximum values may comprise 0 and 1, respectively. The control scheme further includes a plurality of rules that utilize the degrees of membership of each measured input value in the corresponding class used in each rule, and wherein the controller determines outputs to control movements of the first and second winding members to thereby cause the kite to fly in a crosswind trajectory whereby the first and second lines rotate the first and second winding members and generate power.

Another aspect of the present invention is an autonomously controlled kite system including a kite and first and second lines connected to the kite. The system further includes a base such as a ground station including first and second powered line control mechanisms connected to the first and second lines, respectively. The first and second powered line control mechanisms selectively take in and let out the first and second lines. The system further includes a sensor configured to determine a position of the kite relative to the base, and a fuzzy logic base control system that categorizes at least a position of the kite into at least two sets, wherein the degree of membership of the angular position is given a numerical value signifying membership ranging from no membership to full membership. The control system utilizes one or more rules to selectively turn the kite to avoid the ground. The system may be configured to generate power as the lines are let out, and the controller may be configured to cause the kite to fly in back and forth crosswind trajectories and let out the first and second lines while the kite is flying in a crosswind trajectory.

Yet another aspect of the present invention is a method of autonomously controlling a kite. The method includes providing a steerable kite, and connecting the kite to a base utilizing at least one line. The method further includes utilizing a sensor on the ground to determine at least one numerical input value selected from the group consisting of the kite's vertical position, the kite's horizontal position, the kite's vertical velocity, and the kite's horizontal velocity. Allowable horizontal and vertical positions for the kite are determined, and a fuzzy logic control method is utilized. The fuzzy logic control method categorizes the numerical input value into at least one fuzzy set, where the degree of membership in the fuzzy set has a value falling within a predefined numerical range. The value signifies a membership in the fuzzy set ranging from no membership to full membership. The predefined numerical range may comprise a range from 0 to 1. The fuzzy logic control method applies rules to the fuzzy set to produce control outputs that cause the kite to turn and remain within the ranges of allowable horizontal and vertical positions.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 2 is a schematic view of a portion of the kite-based power generation system of FIG. 1;

FIG. 10 shows the velocities of the kite in flight;

FIG. 11 shows the kite speed and average kite speed in flight during autonomous control;

FIGS. 12A, 12B, 12C, 12D and 12E are digital images of a yellow and black kite as recorded by a camera on the ground station;

FIG. 13 is a representation of a colorspace;

FIG. 14 is a representation of a colorspace;

DETAILED DESCRIPTION OF THE INVENTION

Figure 1:
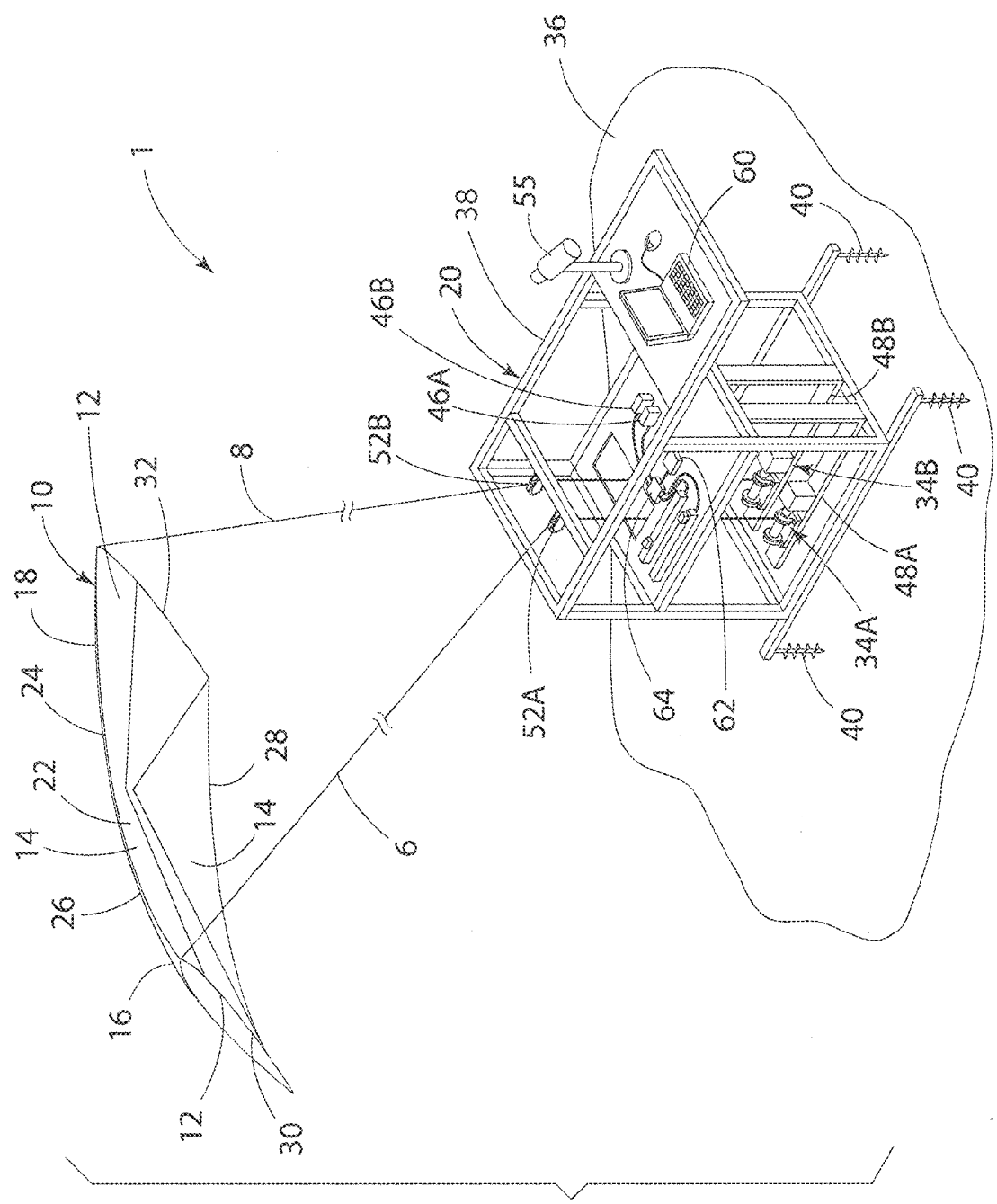
FIG. 1 is an isometric view of a kite-based power generation system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

AWE systems are normally more effective if the kite is flown in a high-speed crosswind trajectory. A crosswind trajectory increases the tension on the lines, thereby providing for power generation. However, controlling a kite autonomously may be difficult because the behavior of a kite is typically highly non-linear and difficult to model due to flexible structures that assume a shape in response to aerodynamic loads. Controlling a kite in a crosswind trajectory is generally more difficult than controlling stable kites for other applications because the kite must not only be kept airborne, but the kite must also preferably maximize power production. A technical challenge of groundgen AWE has been developing a control system that can adequately control the kite utilizing ground based sensors to minimize the weight of the flight vehicle. An autonomous kite controller would be useful for commercial AWE systems due to the difficulty in providing human pilots to operate a large scale system involving a fleet of power producing kites operating full time.

The speed and aerodynamic of flexible kites flying in crosswind trajectories are dependent on wind velocity. Wind variations therefore affect such kites more strongly than traditional rigid-winged aircraft, and the aerodynamic force equations are coupled to internal force equations determining the shape of the kite. These conditions make it difficult to model flexible kites accurately, which introduces significant errors into model based control schemes such as linear-quadratic regulators. These conditions also make validation of control methods using simulations unreliable.

One aspect of the present invention is a ground-based autonomous controller for crosswind power kites. With reference to FIG. 1, a kite-based power-generation system 1 according to the present invention includes a kite 10 and a ground station or base 20. Kite 10 comprises a flexible kite that is connected to base 20 utilizing first and second lines 6 and 8. As discussed below, the lines 6 and 8 can also be reeled in and out to generate electrical power. Kite 10 is preferably a flexible two-line kite. However, kite 10 may also comprise a rigid wing kite. In general, flexible kites have advantages over rigid wing kites because flexible kites can be made lighter, and they therefore can be launched and operated in lower wind speeds. Flexible kites also tend to be more durable in terms of surviving a crash. However, rigid wing kites may have superior aerodynamics, which may be important because the power capability of the system 1 is proportional to the square of the kite's Lift/Drag ratio. Accordingly, the type of kite 10 utilized for purposes of the present invention may be selected based upon the requirements of a particular application.

Referring again to FIG. 1, kite 10 may comprise a commercially available SPEEDFOIL® RM-10 kite available from Cobra Kites Inc. of Toms River, N.J. The kite 10 may have a commercially available "Alert" color scheme including yellow end regions and black central regions. The yellow and black regions 12 and 14 are approximately triangular in shape, such that the opposite ends 16 and 18 of kite 10 are primarily yellow in color, and the central portion 22 of kite 10 is primarily black. As discussed in more detail below, the color pattern of kite 10 can be utilized by a camera 55 and an image processing system to determine the vertical and horizontal position of kite 10 relative to base 20. Sail 24 of kite 10 is generally rectangular, with a leading edge 26, trailing edge 28, and side edges 30 and 32. Sail 24 may be made from a flexible cloth material or the like.

Steering of kite 10 may be accomplished by shortening line 6 to cause kite 10 to turn left, and line 8 can be shortened to cause kite 10 to fly right. As discussed in more detail below, powered winding devices 34A, 34B can be actuated to selectively reel in lines 6 and 8 to turn/control kite 10.

Referring again to FIG. 1, base 20 includes a rigid support structure 38 that is secured to ground surface 36 by ground anchors 40. Alternately, as discussed below, base 20 may be mounted to a movable ground, air, or water craft such that forces on lines 6 and 8 can be utilized to assist/control motion of a vehicle/vessel. As used herein, the term "base" broadly covers stationary and mobile devices that connect to one or more lines that are connected to one or more kites. With further reference to FIG. 2, the powered winding devices 34A, 34B comprise electrical servo motors 42A, 42B that are connected to reels or capstans 44A, 44B. Lines 6 and 8 extend through guides or eyelets 52A and 52B, respectively (FIG. 1), and wind around the reels or capstans 44A, 44B. Guides or eyelets 52A, 52B may be positioned immediately adjacent to one another such that changes in wind direction do not result in an effective shortening/lengthening of lines 6 and/or 8. In the illustrated example, the servo motors 42A, 42B may comprise Kollmorgen AKM 52L servo motors available from Kollmorgen, Inc. of Radford Va. The electrical servo motors 42A, 42B are operably connected to servo drives 46A, 46B, respectively. In the illustrated example, the servo drives 46A, 46B comprise Kollmorgen AKD-P01206 servo drives available from Kollmorgen of Radford Va. The powered winding devices 34A, 34B include encoders that are utilized to measure the length and speed of lines 6 and 8. The servo drives 46A, 46B are operably connected to a laptop computer 60 that is programmed to implement a fuzzy logic controller that provides autonomous flight control of kite 10. It will be understood that various devices may be utilized to lengthen and shorten lines 6 and 8, and the servo motors, servo drives, capstans, and related components described above are merely an example of one configuration that may be utilized according to an aspect of the present invention.

Referring again to FIG. 2, the servo motors 42A, 42B and capstans 44A, 44B are mounted on cantilever members 48A, 48B. Base 20 also includes load cells 50A, 50B that engage cantilever members 48A, 48B, respectively, to measure tension/force in first and second lines 6 and 8, respectively. Ends 51A, 51B of cantilever members 48A, 48B may be pivotally connected to support structure 38. Alternately, the ends 51A, 51B may be rigidly connected to support structure 38. Changes in tension to lines 6 and 8 cause changes in the forces applied to the load cells 50A, 50B, and the tension in lines 6 and 8 can therefore be determined utilizing the load cells 50A, 50B. It will be understood that the load cells 50A, 50B may be calibrated to account for the weight of the various components, the type of connection (e.g. rigid or pivoting) of ends 51A, 51B of cantilevers 48A, 48B, and other variables. In the illustrated example, the load cells 50A, 50B comprise Loadstar DQ-1000u load cells available from Loadstar Sensors, Inc. of Fremont, Calif. However, various sensors may be utilized to determine the tension of lines 6 and 8 according to other aspects of the present invention.

Referring again to FIG. 1, base 20 includes a camera 55 that is operably connected to a laptop computer 60. The laptop computer 60 is operably connected to the servo drives 46A and 46B, load cells 50A, 50B, an Ethernet hub 62, and a USB hub 64. In the illustrated example, camera 55 comprises a Logitech Quick-cam available from Logitech, Inc. of Newark Calif. The camera 55 includes stepper motors that are utilized to track kite 10, giving it a greater than 180° horizontal field of view. Camera 55 comprises part of a tracking system that is utilized to determine the angular position and velocity of kite 10. As discussed in more detail below, the laptop computer 60 executes an image processing program, and also implements a fuzzy logic control system that sends motor speed commands to the servo drives 46A, 46B. Base 20 may also include a weather station including instruments to determine wind speed and direction. The wind speed and direction may be utilized to orient the base 20 at the time ground anchors 40 are secured to the ground surface 36.

Figures 1A, 1B:
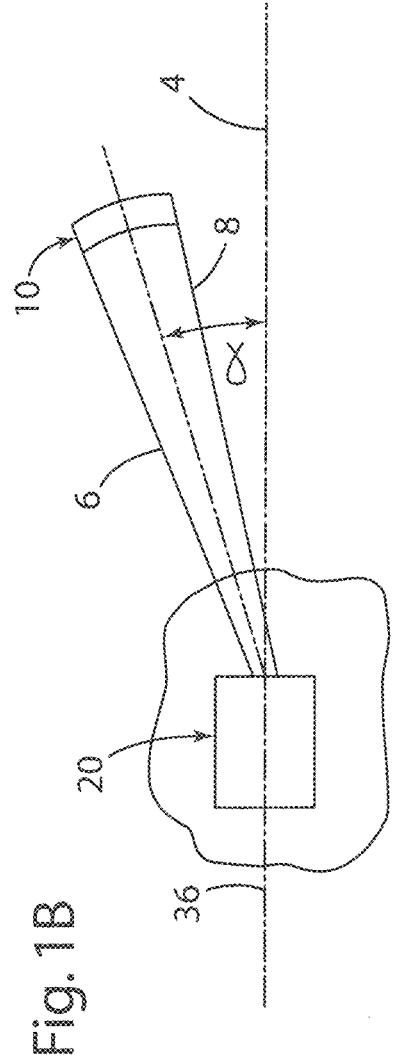
FIG. 1A is a partially schematic view showing the vertical angular position of a kite relative to a ground surface.
FIG. 1B is a partially schematic view showing the vertical angular position relative to a center line of the system wherein the center line corresponds to a wind direction.

As discussed above, kite 10 includes yellow regions 12 adjacent opposite ends 16 and 18 of sail 24. The tracking system implemented by laptop 60 utilizes three methods simultaneously to track the position of kite 10 and distinguish images of kite 10 from other features. Specifically, the tracking system looks for bright yellow light, and simultaneously looks for areas that are much more yellow than in the previous image, and also simultaneously looks for areas in the images that are much darker than in the previous image. The position estimate in image coordinates from the camera 55 corresponds to a pair of angles ($\alpha i$, $\theta i$) from the pointing direction of the camera 55. The pointing direction of the camera is specified by the pan angle, $\alpha c$, and tilt angle $\theta c$. Using a pinhole camera assumption, this relationship is linear, i.e. the number of pixels from the center of the image horizontally and vertically is scaled by the ratio of field of view to image width and height. Referring to FIG. 1A, the vertical position of kite 10 can be expressed as an angle $\theta$, which is calculated by $\theta i + \theta c$, which describes the angular position of kite 10 relative to a ground surface 36. Referring to FIG. 1B, the horizontal position of kite 10 may be expressed as an angle $\alpha$, which is calculated by $\alpha i + \alpha c$, relative to a center line 4. These angles, plus the distance to the kite, based on the length of the lines 6 and 8, as calculated from data obtained from servos 42A, 42B and servo drives 46A, 46B, are used to produce a three-dimensional position estimate. The changes in position divided by the lapsed time between images are used to produce measured velocity estimates. As used herein, the terms "measured velocity" and similar terms may be broadly construed to include an actual measured velocity, as well as a velocity that is calculated utilizing differences in position over a time interval (e.g. a time interval between images generated by camera 55).

Laptop computer 60 is programmed to implement a fuzzy logic control system to shorten and lengthen lines 6 and 8 as required to turn kite 10 to provide a desired trajectory. In general, fuzzy logic is a method of producing universal approximators. In a fuzzy logic control system, numerical input values are categorized (fuzzified) into qualitative categories (fuzzy sets), where their degree of membership in each of several possible sets can be any value in a predefined range. In the illustrated example, the degree of membership can be any value from 0 to 1. However, it will be understood that other ranges (e.g. 0 to 10) may also be utilized. Rules are applied on the categories, making it straightforward to describe what they are doing linguistically. Each rule is evaluated by how applicable the categories are to the values used as inputs, i.e. the degrees of membership of each input value in the corresponding set used in the rule. Rules utilized in fuzzy logic controllers often involve AND and OR statements, which have well defined meanings in Boolean logic, and have been given extended definitions to apply in fuzzy logic. One type of rule evaluates ANDs using a minimum and ORs using a maximum. Then an activation value for each rule is calculated based on how applicable the categories are to the inputs, i.e. the max/min of the degree of membership of each input value in the corresponding set used in the rule. The average of the outputs of all rules, weighted by the activation values, is the output of the Fuzzy Logic System (defuzzification) for a given set of inputs.

A kite control system according to one aspect of the present invention has 8 inputs, including the horizontal and vertical angles of the kite 10, the distance to the kite 10, the rates of change of each of these values, the average line tension of lines 6 and 8, and the difference between the tensions in lines 6 and 8. The control system outputs the desired difference between the right and left line lengths and the desired average line reel rate. Using these inputs and outputs in this manner allows the rules for flying the kite 10 in a Figure 8 pattern and the rules for reeling the kite 10 in and out to be decoupled. As discussed below, each of the inputs is fuzzified into three member functions: a low, nominal, and high member function. There are 7 output values for each output. The borders of the member functions determine parameters of the trajectory, such as horizontal and vertical sides, and how far the lines 6 and 8 reel in and out.

Figure 3:
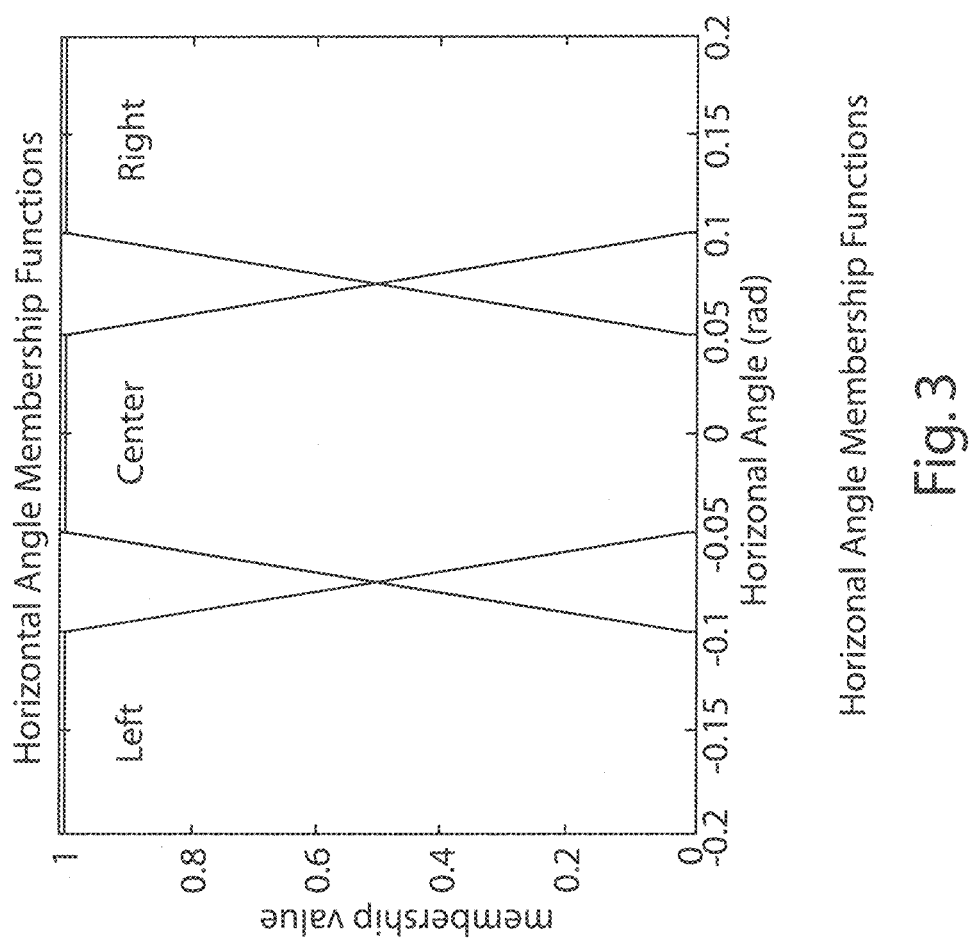
FIG. 3 is a graph showing horizontal angle membership functions of a fuzzy logic control system according to one aspect of the present invention.
Figure 4:
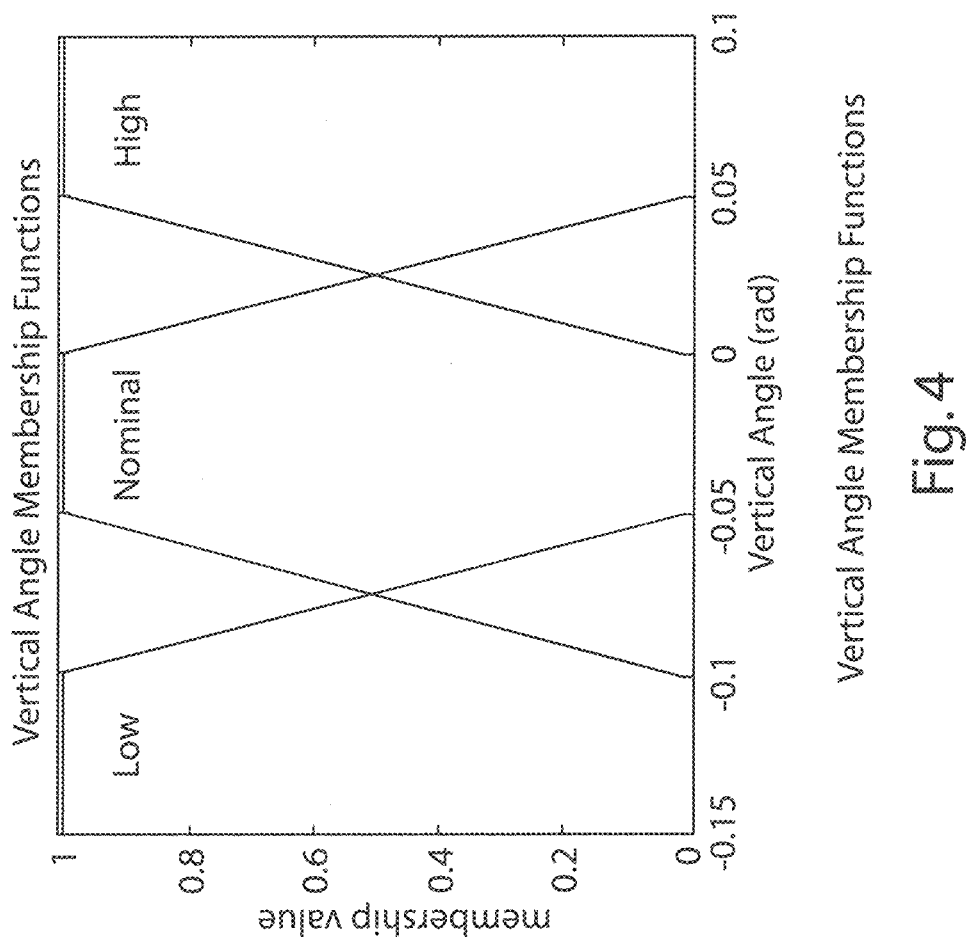
FIG. 4 is a graph showing vertical angle membership functions of a fuzzy logic control system according to one aspect of the present invention.
Figure 5:
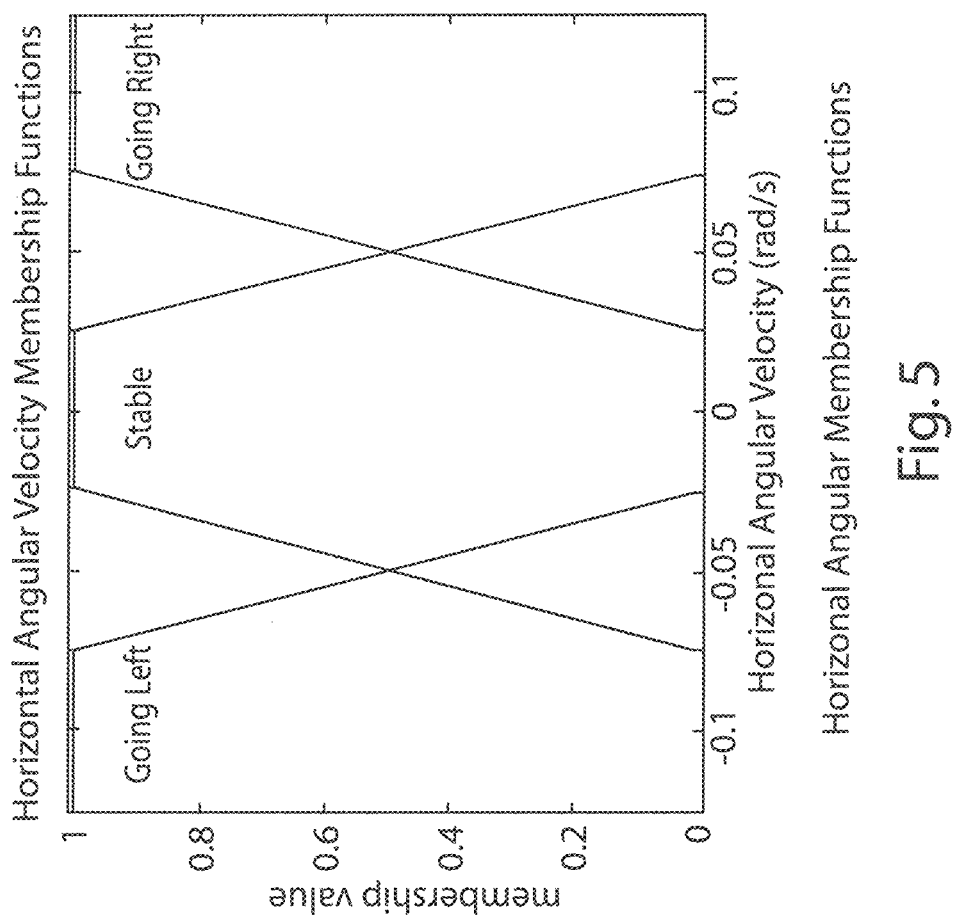
FIG. 5 is a graph showing horizontal angle velocity membership functions of a fuzzy logic control system according to one aspect of the present invention.
Figure 6:
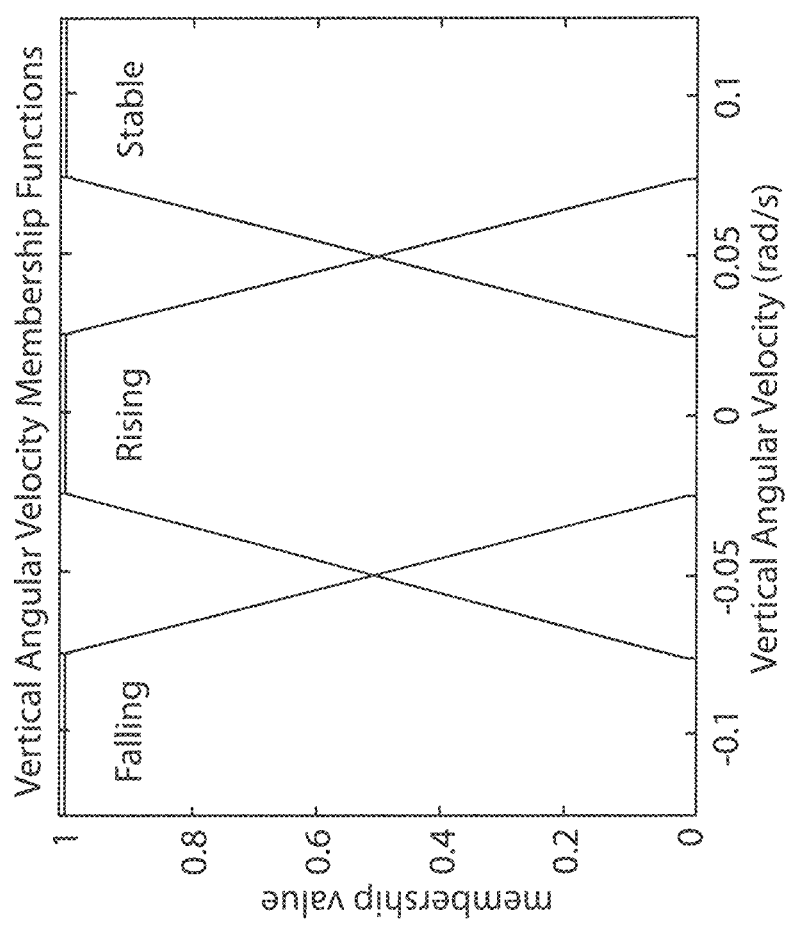
FIG. 6 is a graph showing vertical angle velocity membership functions of a fuzzy logic control system according to one aspect of the present invention.

FIG. 3 shows the horizontal angle membership functions, FIG. 4 shows the vertical angle membership functions, FIG. 5 shows the horizontal angular velocity membership functions, and FIG. 6 shows the vertical angular velocity membership functions. In the illustrated example, a horizontal angle measured to be −0.0625 radius would result in a membership value of 0.25 in the class "Left", a membership value of 0.75 in the class "Center", and a membership value of 0 in the class "Right", while a horizontal angle measured to be 0.11 radius would have a membership value of 1 in the class "Right", and a membership value of 0.0 in the other two classes. The same process is applied for each input in the fuzzy control system. For example, if the horizontal and vertical angles were measured to be −0.0625 and −0.0875 radius, respectively, and the horizontal and vertical rates were measured to be −0.05 and −0.05, then fuzzification would result in membership values of 0.25 for "Left", 0.75 for "Center", and 0.0 for "Right", 0.75 for "Low", 0.25 for (vertical) "Nominal", 0.0 for "High", 0.5 for "Going Left", 0.5 for no horizontal motion ("Stable"), 0.0 for "Going Right", 0.5 for "Falling", 0.5 for no vertical motion ("Stable"), and 0.0 for "Rising." It will be understood that the membership functions of FIGS. 3-6 are examples of membership functions according to one aspect of the present invention, but the present invention is not limited to the specific membership functions of FIGS. 3-6.

A fuzzy control system according to one aspect of the present invention utilizes the following set of rules related to turning the kite 10 using its angular position and velocity as follows:

1. If the kite is Stalled (not moving vertically or horizontally) then wait (don't try to turn).
2. If Low, Going Left, and Falling then turn right hard (prevent imminent crash).
3. If Low, Going Right, and Falling then turn left hard (prevent imminent crash).
4. If Low and Rising then hold course (wait for kite to regain altitude).
5. If Left and Going Left then turn right (keep kite within wind window).
6. If Left and Rising then turn right slowly (finish turn keeping kite within wind window).
7. If Left and Going Right then hold course (allow kite to cross center of wind window).
8. If Left and Going Right and Down then turn left (previous turn has over-corrected).
9. If Right and Going Right then turn left (keep kite within wind window).

10. If Right and Going Up then turn left slowly (finish turn keeping kite within wind window).
11. If Right and Going Left then hold course (allow kite to cross center of wind window).
12. If Right, Going Left, and Falling then turn right (previous turn has over-corrected).
13. If Center, Going Left, and Falling then turn left slowly (begin turn early to prevent crashes).
14. If Center, Going Right, and Falling then turn left slowly (begin turn early to prevent crashes).
15. If High, Going Right, and Rising then turn right (keep kite from rising higher than intended pattern).
16. If High, and Going Left, and Rising then turn left (keep kite from rising higher than intended pattern).

The rules above are all "AND" rules, and are activated based on the minimum membership values of any class included in the rule. For the set of measurements fuzzified above, where Right, High, Going Right, and Rising all have a value of 0.0, rules 3, 4, 6-12, and 14-16 would not be activated. Rule 1 would have an activation value of 0.5, as the values for both no horizontal motion and no vertical motion are both 0.5. Because the values for Low, Going Left, and Falling, respectively, are 0.75, 0.5 and 0.5, rule 2 would also be activated with a value 0.5. The value of 0.25 for Left sets the activation value of rule 5 to 0.25. Rule 13 has an activation value of 0.5. For this example set of inputs, the system therefore has a rule activated at 0.5 to not turn, a rule activated at 0.5 to turn right hard, a rule activated at 0.25 to turn right, and a rule activated at 0.5 to turn right slowly.

The rule results are then combined to produce the output of the control system. Because of differences between kite models, a user manually enters the number of inches to deflect the lines to produce a standard turn. In the illustrated example, for a Cobra Kite SPEEDFOIL® RM-10, a value of 24 is normally used, meaning that for a right turn, the right line is retracted 24 inches and the left line is extended 24 inches. A hard turn is 25% further than a normal turn (30 inches here) and a slow turn is 50% of the normal turn value (12 inches). For the illustrated system, the rules are all weighted equally, so the example inputs given above produce the result (0.5+0.0+0.5 30+0.25 24+0.5 12)/(0.5+0.5+0.25+0.5)=15.4 inches.

Figure 7:
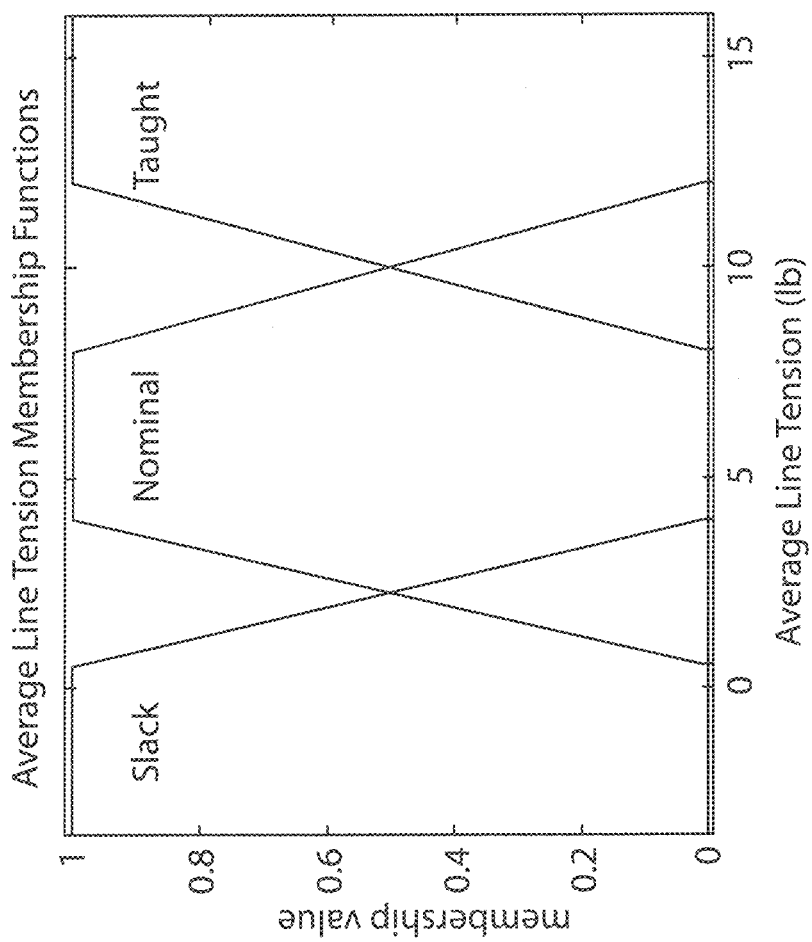
FIG. 7 is a graph showing average line tension membership functions of a fuzzy logic control system according to one aspect of the present invention.

The Average Line Tension membership functions are shown in FIG. 7. The Average Line Tension is the average tension of lines 6 and 8 as measured by load cells 50A, 50B, respectively.

Figure 8:
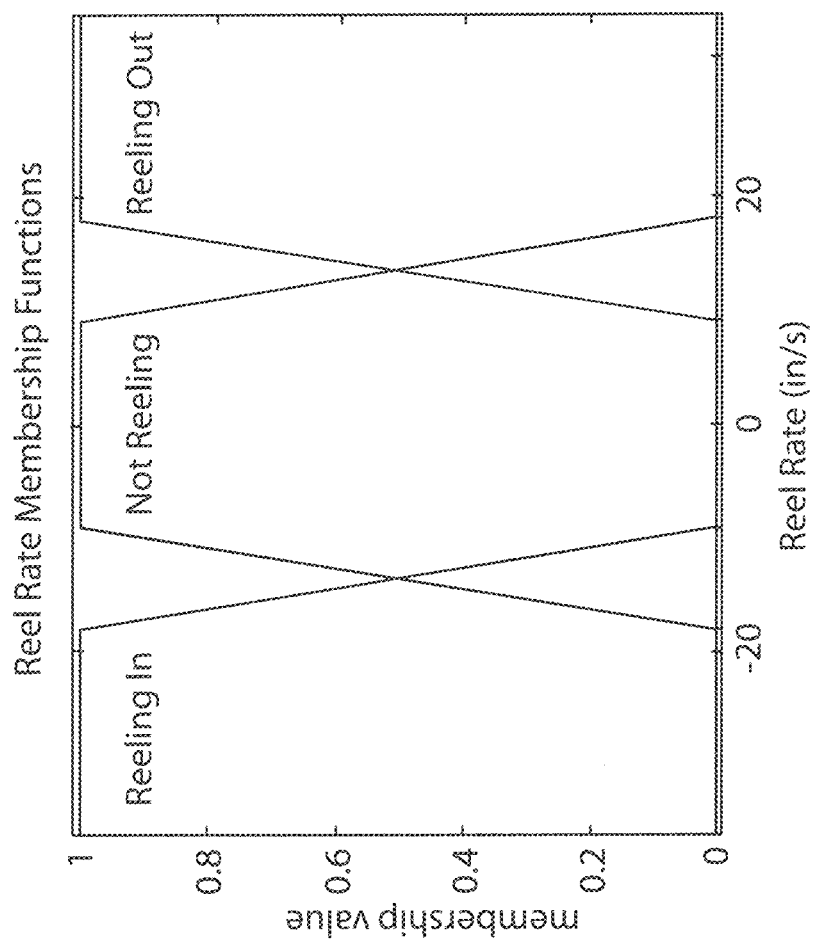
FIG. 8 is a graph showing reel rate membership functions of a fuzzy logic control system according to one aspect of the present invention.

The fuzzy logic control system may also utilize information from the encoders of the servo motors 42A, 42B to determine if the lines 6 and 8 are being reeled in, reeled out, or not reeling. With reference to FIG. 8, these measured values may be fuzzified by applying a membership function that may be similar to the membership functions of FIGS. 3-7 to categorize the membership of the reel rate in the sets "Reeling In", "Not Reeling", and "Reeling Out." It will be understood that the specific membership functions may be different than the membership functions of FIG. 8 as required for a particular kite configuration, etc. The fuzzy logic control system utilizes 6 rules related to the reel rate. Specifically, if the line is:
1. Slack and Not Reeling then Reel In slowly.
2. Taut and Not Reeling then Reel Out slowly.
3. Slack and Reeling In then Reel in Quickly.
4. Taut and Reeling In then Stop Reeling.
5. Slack and Reeling Out then Stop Reeling.
6. Taut and Reeling Out then Reel Out Quickly.

Because this system has a singularity where the kite is flying straight down, the control system also includes a feature that tracks which way the lines 6 and 8 are twisted, and modifies the right-left speed input to the fuzzy controller so it will untwist the lines 6 and 8 while turning away from the ground.

Figure 9:
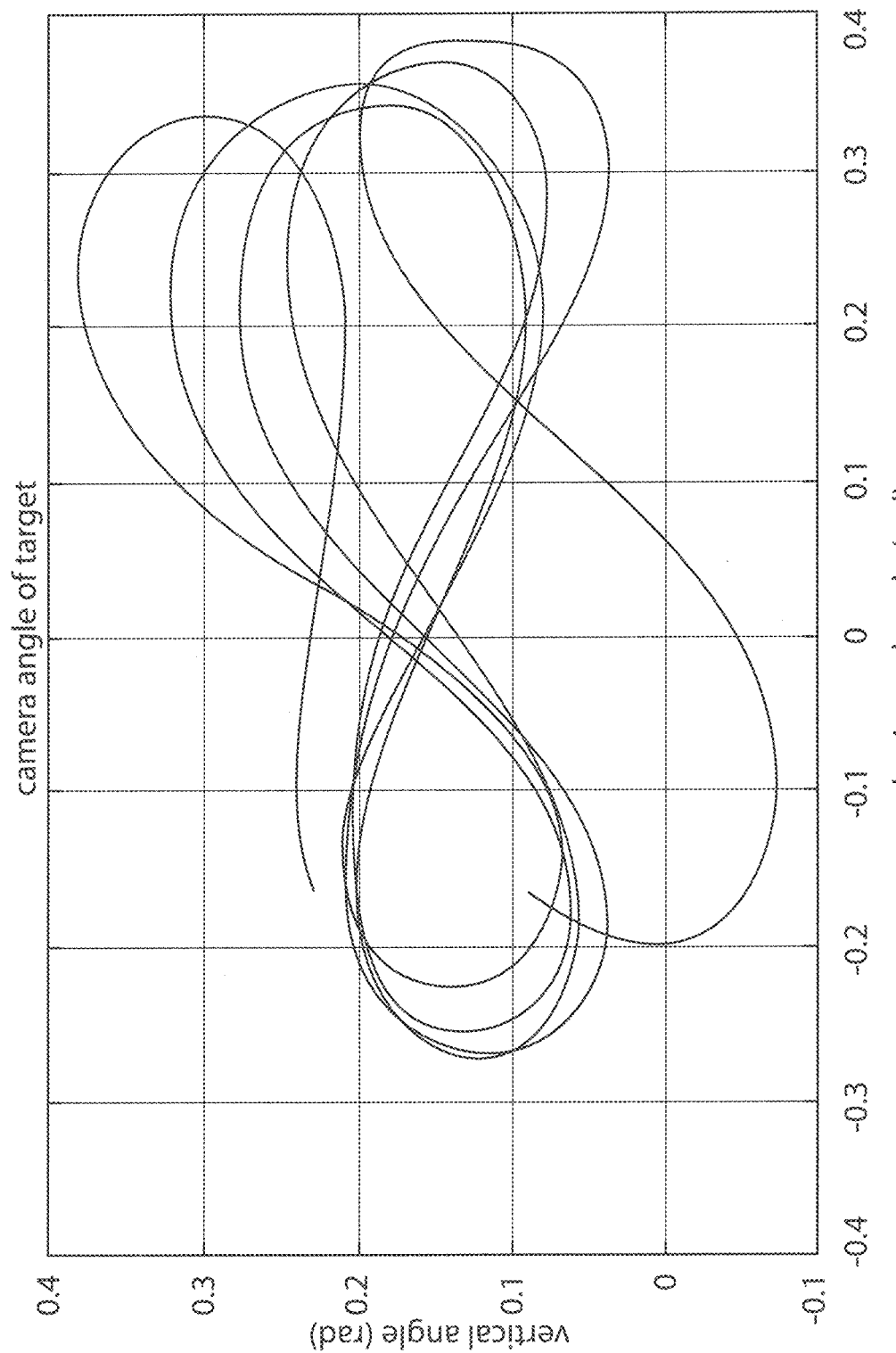
FIG. 9 shows the angular position of the kite during flight utilizing autonomous control according to one aspect of the present invention.

FIGS. 9-11 show the results of test flights of kite 10. With reference to FIG. 9, the fuzzy logic control system causes the kite 10 to fly in a trajectory forming a series of Figure 8 patterns. The velocity of the kite 10 with time is shown in FIGS. 10 and 11. In general, the velocity plots clearly show the corresponding oscillations in each axis. It will be understood that the flight patterns of FIG. 9 and velocities of FIGS. 10 and 11 are the result of autonomous control of kite 10, with no human input. In general, the system 1 provides for a consistent, stable trajectory of kite 10 when the wind velocity is relatively stable. In most cases, the stable trajectory is slightly asymmetric despite a perfectly symmetric control algorithm. This asymmetry is also usually present when a person is flying a kite, and may be due to an error between the center of the pattern and the center of the window, resulting in a higher component of velocity perpendicular to the line on one side of the trajectory. When the wind speed drops, the line tension and kite speed drop as well. Wind gusts result in the kite speeding up or drifting away from the commanded trajectory. In general, wind gusts will cause the kite to deviate from the desired Figure 8 path (FIG. 9) for a relatively short period of time until the controller compensates. When the wind speed drops off for a prolonged period, the kite 10 cannot maintain its altitude, and it must be either reeled in or allowed to land.

By causing the kite 10 to fly in a Figure 8 pattern (FIG. 9), the kite flies in a crosswind trajectory for power generation. Also, the Figure 8 pattern can be utilized to keep the kite within the "wind window." Keeping the kite 10 within the wind window maximizes power generation of system 1. In general, the wind window is a three dimensional region bounded by maximum horizontal and angular positions of the kite 10. If the kite 10 is viewed from the base 20, the wind window will generally have a semi circular shape with a horizontal line at or immediately adjacent the ground. Although the term "wind window" is believed to be well understood in the art, the wind window does not typically define a precise boundary. If kite 10 is flown outside of the wind window, the ability of the kite 10 to generate power falls off significantly.

Because the aerodynamic forces on a kite 10 are proportional to the square of air speed, maximizing air speed maximizes power production for a given line speed. Thus, a kite that is configured to hold position in the sky has an air speed equal to the wind speed, while a kite flying a crosswind trajectory has an air speed close to the lift to drag ratio of the kite multiplied by the wind speed. In order to stay within the wind window, the controller of the present invention causes the kite 10 to fly in a curved, repeating path such as the Figure 8 patterns of FIG. 9. Because the kite 10 utilizes first and second lines 6 and 8, the pattern is preferably a Figure 8 that prevents twisting of the lines 6 and 8. However, it will be understood that kite 10 may comprise a single line kite that can be controlled utilizing movable control surfaces on the kite utilizing, for example, remote control and powered actuators onboard the kite. If the kite 10 comprises a single line kite, the controller may be configured to cause the kite to fly in a trajectory forming a circle, oval, or other such configuration.

If kite 10 comprises a single line kite that is remotely controlled (e.g. similar to an RC aircraft flying on a single line), the tether drag is reduced, and control lag resulting from stretching in the lines is also reduced or eliminated. Accordingly, it will be understood that the present invention is not limited to a two line kite, and the fuzzy control system does not necessarily need to cause the kite to fly in figure 8 flight patterns.

Also, although a pan-tilt camera 55 (FIG. 1) may be utilized in kite-based power generation system 1, other sensors may be utilized to determine the position of kite 10. For example, a hemispherical mirror, fish-eye or wide angle lens, or multiple cameras could be utilized in connection with base 20 to cover large areas of the sky. Also, line angle sensors, IR cameras, Lidar, or Radar may be utilized to detect the position of kite 10 from the ground. In general, such systems do not require positioning a sensor onboard kite 10, thereby eliminating disadvantages (e.g. weight) that are typically associated with on-board sensors.

It will be understood that the fuzzy logic control system has been described as including fuzzy sets wherein the degree of membership of an input value in each set can be any value between 0 and 1. However, it will be understood that the values 0 and 1 represent one possible configuration, and other ranges may be utilized. For example, the degree of membership in each set could be any value between 0 and 10, and the rules could be scaled accordingly (e.g. divided by 10) to provide substantially the same results. Also, it will be understood that the membership functions may be varied to account for differences in the kite design, operating conditions, and the like. Furthermore, the specific rules applied by the fuzzy logic control system may be modified as required to provide for autonomous control according to other aspects of the present invention.

Figure 18:
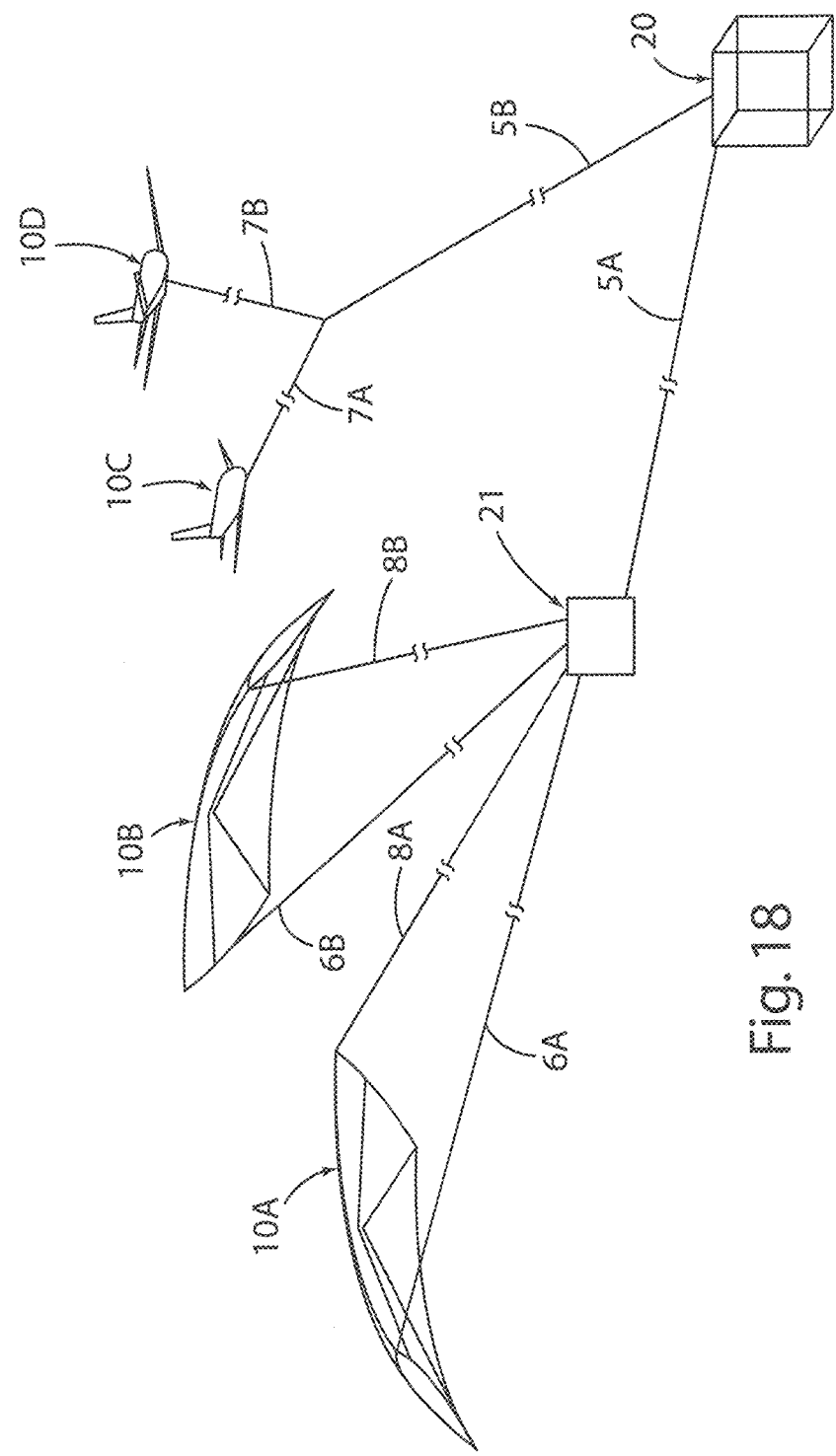
FIG. 18 is an isometric view of a kite-based power generation system that includes a plurality of kites.

With further reference to FIG. 18, a kite system according to the present application may include a plurality of two-line kites 10A, 10B, etc. that are connected to lines 6A, 8A and 6B, 8B, respectively. The lines 6A, 8A and 6B, 8B are connected to a control pod 21 that is, in turn, connected to base 20 by a tether 5A. Control pod 21 may include powered actuators (not shown) that vary the relative lengths of lines 6A, 8A and 6B, 8B to individually control kites 10A and 10B. For example, a single line could be wrapped around a pulley (not shown), and opposite ends of the line would form lines 6A and 8A. A powered actuator such as an electric motor rotates the pulley to lengthen line 6A while simultaneously shortening line 8A to turn kite 10A in a first direction. Opposite rotation of the pulley causes kite 10A to turn in an opposite direction. Each additional kite 10B tethered to control pod 21 has a separate motor and pulley. Control pod 21 may contain sensors to measure the force produced by each kite or each line. A generator on base 20 is operably connected to tether 5A, and ground station 20 reels tether 5A in and out to generate electrical power. Base 20 may be connected to a plurality of tethers 5A, and control pods 21, and each tether 5A and control pod 21 may be connected to a plurality of kites 10A, 10B, etc.

The kite system may also include one or more single-line kites 10C, 10D that may be similar to RC aircraft. The one-line kites 10C and 10D are connected to a tether 5B by lines 7A and 7B. Kites 10C and 10D may be remotely controlled utilizing remotely controlled powered actuators and control surfaces on the kites 10C and 10D utilizing radio signals received from a transmitter (not shown) on base 20. Control of kites 10C and 10D is based on position data input utilizing sensors (e.g. camera 55) on base 20. Tether 5B is operably connected to a generator of base 20 such that tether 5B can be reeled in and out to generate electrical power.

If the kite system includes a plurality of kites, the control system may be configured to cause the kites to turn in substantially the same directions at substantially the same times such that the kites fly in unison and maintain substantially constant spacing between adjacent kites. Thus, spacing between adjacent kites may be utilized as a control parameter in addition to the allowable horizontal and vertical positions of each individual kite.

In the system of FIG. 18, the tracking system and camera 55 are utilized to determine the positions and velocities of each kite 10, 10A, 10B, etc., and allowable horizontal and vertical positions for each kite 10, 10A, 10B, etc. are determined. The controller utilizes a fuzzy logic control scheme to produce outputs that cause the kites 10A, 10B, 10C, 10D to turn and remain within the ranges of allowable horizontal and vertical positions. The fuzzy logic control system may be substantially similar to the system described above, except that the control system turns all of the kites 10A, 10B, 10C, 10D to ensure that all of the kites stay within the ranges of allowable horizontal and vertical positions. It will be understood that a multi-kite system may include only two-line kites (e.g. kites 10A and 10B) or only single-line kites (e.g. kites 10C, 10D).

The control system of the present invention may also be utilized to provide supplemental power and/or steering for a land, air, or water vehicle. Because the control system provides for autonomous flight, base 20 may comprise an air vehicle, a water vessel (e.g. a boat or ship), or a land vehicle, and tension on lines 6 and 8 can be utilized to assist in propulsion and/or steering of the vehicle. It will be understood that the base 20 would not necessarily need to include power generating capability if it is used for this type of an application.

The kite system may also be utilized to determine wind speed and direction at different altitudes. With reference to equation 1, if the kites lift to drag ratio is known (e.g. accurately measured), and the tracking system is used to obtain crosswind velocities near the center of a Figure 8 where the kite is moving approximately horizontally at an approximately constant velocity, then dividing the measured velocity by (L/D) will produce a value for the difference between line speed and wind speed. Repeated measurements can be taken and averaged to mitigate errors from image noise. A correction may be utilized for high line angles (e.g. angle θ, FIG. 1A). However, if the line angle θ remains below about 20°, the error due to line angle would be relatively small. With respect to determining the wind direction, the kite's velocity will generally be highest near the center of the Figure 8 when the center of the Figured 8 is directly downwind from the base 20. The wind direction can be determined by moving the center of the Figure 8 to one side and then the other to find the center of the wind window where the kite's crosswind velocity and the measured wind speed are highest.

Another way to determine wind speed and direction involves utilizing Newton's second law, namely that the vector sum of applied forces equals mass times acceleration. The acceleration can be calculated from the change in velocity of the kite divided by elapsed time, the forces on the kite are weight due to the mass of the kite (which can be measured), line tension (which is measured by base 20), and the aerodynamic force, which can then be calculated. The aerodynamic force is:

$$\sqrt{L^2 + D^2} = \frac{1}{2}\rho A v_a^2 \sqrt{c_L^2 + c_D^2}$$

Thus, given measurements of the kite's coefficients of lift and drag, its area, and calculating the current air density, the airspeed can be calculated. The difference between the airspeed and the ground speed (which is measured by the tracking system) is wind speed. This approach is not limited to taking measurements when the kite is flying horizontally at a constant speed.

The kite can be flown at different altitudes by reeling the lines 6 and 8 in and out to position the kite 10 at the desired altitude.

The visual tracking system will now be described in more detail. The goal of tracking kites is complicated by the variety of different backgrounds and lighting conditions that are possible. For example, a kite may fly in front of trees, grass, buildings, clear sky, cloud cover, scattered clouds, or the sun. The ambient light varies depending on time of day and cloud cover, while the light reflecting off the kite 10 and background is related to ambient light and the position of the sun. For certain positions of the sun relative to the camera 55, it is even possible to have large differences in the hue and brightness of the sky across a single image. As discussed above, kite 10 has a yellow and black pattern. This patter is very good at creating contrast with a variety of dark and light backgrounds, but its appearance is different over the different backgrounds. For example, only the bright yellow pattern is visible against a dark treeline, while only a dark silhouette appears if the kite 10 is back-lit in a bright area of the sky. At some distances and resolutions, the yellow of the kite 10 can blend with the blue of the sky to produce red or magenta pixels (FIG. 12). Therefore a tracking system based solely on finding yellow objects will fail under some conditions, and a tracking system looking for dark objects will produce numerous false positives, while losing the kite 10 over dark backgrounds. In flight, the kite 10 is usually moving, stopping only when it stalls. Thus, looking for changes between images is a good method for tracking the kite 10 but this approach is subject to image noise, and the system is momentarily blinded when the camera 55 moves.

Figure 15:
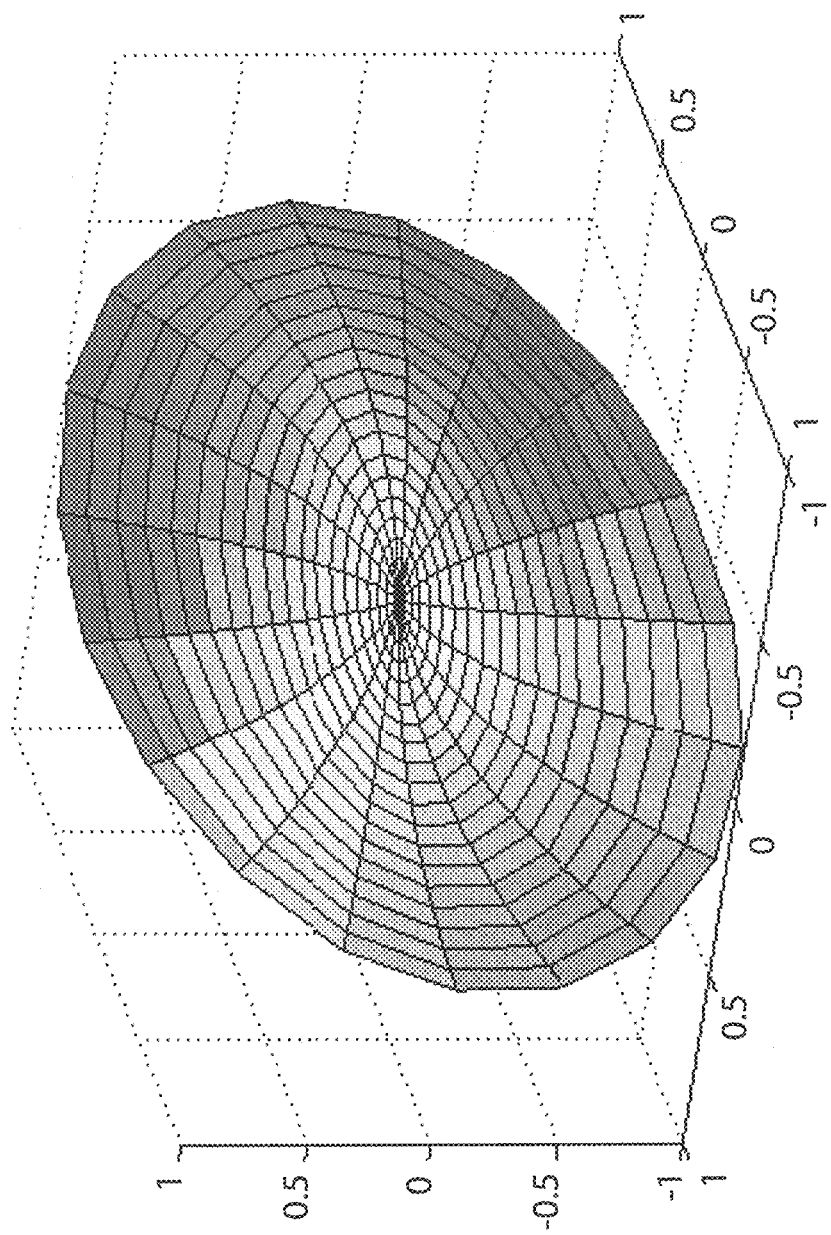
FIG. 15 is a graph showing color detection values.

The tracking system therefore uses three algorithms: color, change in color, and change in brightness. For the first algorithm, color detection, bright orange, yellow, red, and magenta are assigned high values, bright green, cyan, and blue are assigned low values, and white, gray, dull colors, yellow-green, and indigo are assigned intermediate values (FIG. 15). This is computed by the equation color value=Chroma$^2$ cos(2π(hue−hue0)) where Chroma is equivalent to the product of Saturation and Value in the HSV colorspace (FIGS. 13 and 14). Hue0 represents the highest valued color; 0.02, a red-orange, is used because it is near the center of the yellow-magenta range. Differently color kites may be detected by modifying this value, provided that the color of the kite has sufficient contrast with background colors.

For the second algorithm, the change in color is computed for each pixel from the equation for "color value" above, subtracting the result from the corresponding pixel of the previous image.

Figure 16:
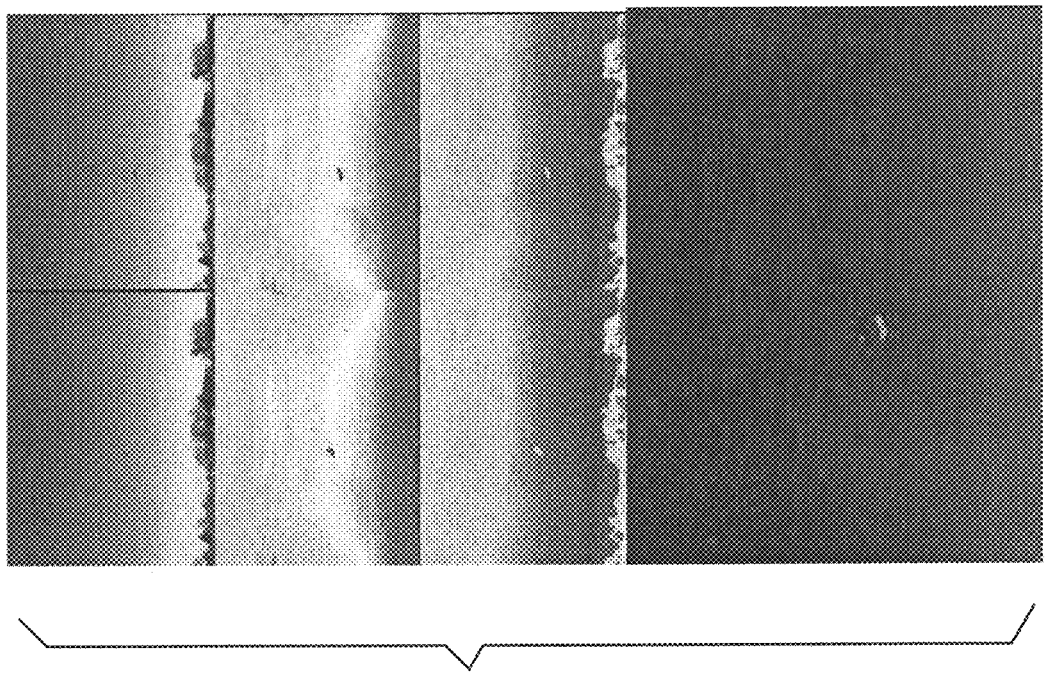
FIG. 16 comprises four rows of images including sample images (first row), color detection images (second row), images showing inverse of brightness (third row), and an image showing a result of applying three algorithms to images.

For the third algorithm, brightness is calculated from the value coordinate of the HSV colorspace (FIGS. 13 and 14), and change in brightness is calculated from the current subtracted from the previous brightness, resulting in a positive number for a pixel that is darker than in the previous image. FIG. 16 shows two sample images of the kite 10 in flight on the first row. The second row shows the result of the color detection, and the third row shows i-brightness, highlighting dark areas of the image. The final (bottom) image shows the three algorithm results: the red channel is color detection, the green channel is the change in color between the two images, and the blue channel is the change in brightness. The location of the kite 10 which is clearly detected by all three algorithms in this case, shows up in light gray, while the especially dark area just above the kite is the "shadow" of where the kite was in the previous image. The neutral black and white colors at the bottom of the image show up as a reddish haze, and the rest of the image is relatively dark, indicating nothing of interest.

The images acquired by the tracking system are divided into 6×8 array of sub-images because the background can vary so much across an image that a kite flying across a dark area of sky may be indistinguishable from part of a tree, or a kite flying across a bright cloud may look similar to a darker area of the sky (FIG. 12). In the sample images in FIG. 16, the color detection shows higher values in the background at the bottom of the image than at the kite itself (see second row). The average of each algorithm in each sub-image is computed and subtracted from the algorithm values. Tuning values are subtracted from the results as well. For example, if camera 55 comprises a Logitech® Quickcam, the values 0.03, 0.06, and 0.08 have been found to work well as tuning values for the color, change in color, and change in brightness algorithms, respectively.

Figure 17:
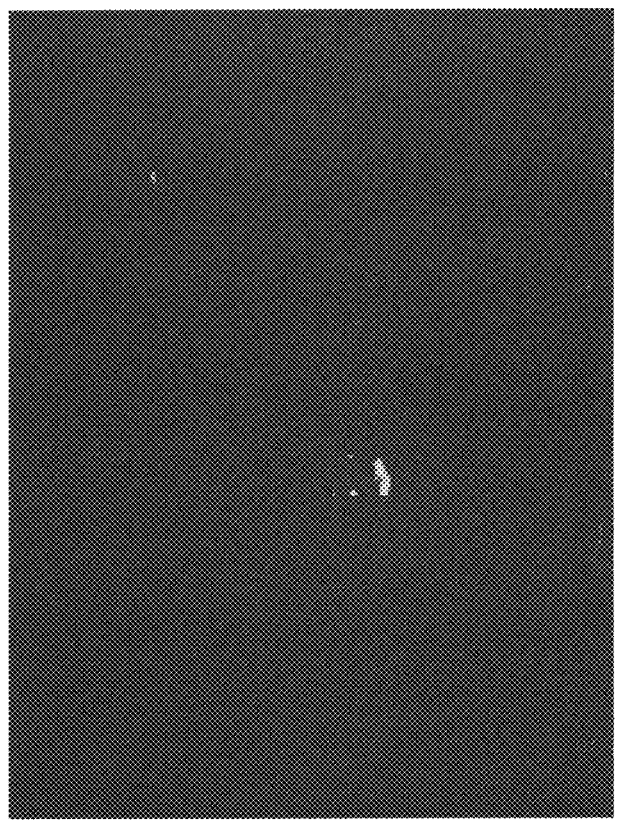
FIG. 17 is an image showing the result of the detection algorithms after removal of background from each sub-image.

Next the resulting values greater than zero are added together for each algorithm in each sub-image, and the weighted average of those pixel locations is calculated. FIG. 17 highlights (with red, green, and blue dots) the averaged pixel locations for each region in which one of the algorithms produced a non-zero result; in addition to the kite, two locations near the bottom of the image produced color results, one area near the top right produced a change in color result, and two other areas near the bottom of the image produced change in brightness results. However, the kite is the only area where more than one algorithm found a result, and the results at the kite are by far the most significant.

Two different methods may be utilized to further process the results of the color, change in color, and change in brightness algorithms. A first method involves finding the block with the highest result for each of the three algorithms, and passing them to a voting algorithm. The voting algorithm compares the pixel locations returned for the three algorithms, and if any two of them are within 16 pixels, that is determined to be the location of the kite 10. Otherwise, if one of them is within 25 pixels of the expected location (the previous location plus the previous velocity multiplied by the time between when the images were taken), that is determined to be the new kite location. If none of the results is close to the expected position, the system continues to use the expected position until an image with a less ambiguous result is acquired.

A second method, which is designed to track multiple objects simultaneously, calculates a combined score from the three algorithms for each sub-image, and records the locations of a number of the highest scores (currently that number is 10). These locations are compared to the expected locations for the previously detected objects and if any are within 20 pixels (close to the size of the kite, assuming a 10 ft kite 150 ft away imaged in 320×240 pixels using a lens with a 1 rad horizontal field of view), they are assumed to be the same object and a new velocity and expected next position are calculated. Objects that are moving and have existed for multiple images are assumed to be kites.

The position estimate in image coordinates from the vision system corresponds to a pair of angles relative to the pointing direction of the camera 55. Using a pinhole camera assumption, this relationship is linear, i.e. the number of pixels from the center of the image horizontally and vertically is scaled by the ratio of field of view to image width and height. The changes in angular position divided by the elapsed time are used to produce angular velocity estimates. A low-pass filter is applied to the position and velocity estimates in order to mitigate the effects of image noise (the current position or velocity estimate is averaged with the previous expected position or velocity).

This position and velocity information is used by both the fuzzy controller and the pan-tilt controller of camera 55. The pan-tilt controller defines a buffer region around the image extending inward 0.075 radians from the edge. In order to minimize the chance of panning due to image noise and tracking errors, the controller only pans if a detected kite follows a plausible path toward the edge of the image. In order to pan, the tracking system must first detect that the kite 10 either moving toward the buffer fast enough to cross into it by the next image, or be inside the buffer moving toward the edge for one or more images. After that, if the kite 10 remains in the buffer moving toward the edge for another two images, or is detected inside the buffer moving toward the edge fast enough to cross it by the next image, the controller will move the camera 55 to ensure that the kite 10 remains within the field of view of camera 55. It will be understood that camera 55 may comprise a wide angle camera such that a pan-tilt controller is not required.

What is claimed is:

1. An autonomously controlled kite system comprising:
at least one kite that turns based on control. inputs;
at least one line connected to the at least one kite;
a base including a line control. mechanism connected to the at least one line, wherein the line control mechanism selectively takes in and lets out the at least one line;
a sensor configured to determine at least one of a position and a velocity of the at least one kite relative to the base; and
a fuzzy logic control system that categorizes the at least one of the position and the velocity of the at least one kite into at least two sets,
wherein a degree of membership of the position and/or velocity is given a numerical value signifying membership ranging from no membership to full membership, the control system utilizing one or more rules to generate control inputs that selectively turn the kite to avoid the ground,
wherein the controller causes the kite to fly in a series of crosswind trajectories and lets out the at least one line while the kite is flying in a crosswind trajectory, and
wherein the line control mechanism includes a generator that generates power as the at least one line is let out.

2. The kite system of claim 1, wherein:
the kite is connected to the line control mechanism by first and second lines, and wherein the line control mechanism includes at least one powered actuator whereby the first and second lines can be selectively taken in under power, and wherein the control inputs comprise shortening one of the first and second lines relative to the other of the first and second lines.

3. The kite system of claim 1, wherein:
the base is mobile, whereby a tension on the at least one line can be utilized to influence movement of the base.

4. The kite system of claim 1., wherein:
the at least one kite comprises a group of kites, and the sensor determines positions of each kite; and
the control system produces control outputs that cause each kite to turn and remain within the ranges of allowable horizontal and vertical positions for each kite.

5. The kite system of claim 1, wherein:
the sensor determines a wind speed and a direction of the kite at a plurality of altitudes.

6. A method of autonomously controlling a kite, the method comprising:
providing at least one steerable kite;
connecting the kite to a base utilizing at least one line;
utilizing a camera on the ground to generate images of the at least one kite;
utilizing the images to determine at least one numerical input value relating to at least one of a position. and a velocity of the at least one kite;
determining allowable flight positions for the at least one kite; and
utilizing the one numerical input value in a feedback control to produce control outputs that cause the at least one kite to turn and remain within the allowable flight positions,
wherein the feedback control comprises a fuzzy logic control method that categorizes the numerical input value into at least one fuzzy set,
wherein a degree of membership in the fuzzy set has a value falling within a predefined numerical range, the value signifying a membership in the fuzzy set ranging from no membership to full membership, and
wherein the fuzzy logic control method applies rules to the fuzzy set to produce control outputs that cause the kite to turn and remain within ranges of allowable horizontal and vertical positions.

7. The method of claim 6, including:
providing a group of steerable kites;
connecting the steerable kites to the base utilizing lines, wherein the camera is utilized to determine at least one numerical input value for each of the kites;
determining allowable horizontal and vertical flight positions for each kite, wherein the feedback control produces control outputs that cause each kite to turn and remain within the ranges of allowable. Horizontal and vertical positions for each kite.

8. The method of claim 7, wherein:
the feedback control causes the kites in the group to turn at substantially the same times and in substantially the same directions.

9. The method of claim 6, wherein:
the base is mobile, whereby a tension on the at least one line can be utilized to influence movement of a ground station.

10. The method of claim 6, wherein:
utilizing a position and a velocity determined by the camera to determine wind speed and direction at a plurality of altitudes.

11. An autonomously controlled kite system comprising:
at least one kite that turns based on control inputs;
at least one line connected to the at least one kite;
a base including a line control mechanism connected to the at least one line, wherein the line control mechanism selectively takes in and lets out the at least one line;
a sensor configured to determine at least one of a position and a velocity of the at least one kite relative to the base; and a fuzzy logic control system that categorizes the at least one of the position and the velocity of the at least one kite into at least two sets, wherein a degree of membership of the position and/or velocity is given a numerical value signifying membership ranging from no membership to full membership, the control system utilizing one or more rules to generate control inputs that selectively turn the kite to avoid the ground, wherein the kite is connected to the line control mechanism by first and second lines, and wherein the line control mechanism includes at least one powered actuator whereby the first and second lines can be selectively taken in under power, and wherein the control inputs comprise shortening one of the first and second lines relative to the other of the first and second lines.

12. The kite system of claim 11, wherein:

the at least one kite comprises a group of kites, and the sensor determines positions of each kite; and the control system produces control outputs that cause each kite to turn and remain within the ranges of allowable horizontal and vertical positions for each kite.

\* \* \* \* \*